(12) United States Patent
Maki (10) Patent No.: US 10,454,253 B2
(45) Date of Patent: Oct. 22, 2019

(54) METHOD FOR MANUFACTURING AN IGNITION PLUG INCLUDING A MARK FORMED OF AN OXIDE FILM

(71) Applicant: NGK SPARK PLUG CO., LTD., Nagoya-shi, Aichi (JP)

(72) Inventor: Shunsuke Maki, Konan (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/152,601

(22) Filed: Oct. 5, 2018

(65) Prior Publication Data

US 2019/0044310 A1 Feb. 7, 2019

Related U.S. Application Data

(62) Division of application No. 15/974,851, filed on May 9, 2018.

(30) Foreign Application Priority Data

May 11, 2017 (JP) ................................. 2017-094516

(51) Int. Cl.
| | | |
|---|---|---|
| H01T 21/02 | (2006.01) | |
| H01T 13/02 | (2006.01) | |
| G06K 19/06 | (2006.01) | |
| B23K 26/40 | (2014.01) | |
| B23K 26/352 | (2014.01) | |

(Continued)

(52) U.S. Cl.
CPC .......... *H01T 21/02* (2013.01); *B23K 26/0006* (2013.01); *B23K 26/083* (2013.01); *B23K 26/355* (2018.08); *B23K 26/359* (2015.10); *B23K 26/364* (2015.10); *B23K 26/40* (2013.01); *G06K 1/128* (2013.01); *G06K 19/06046* (2013.01); *H01T 13/02* (2013.01); *H01T 13/04* (2013.01); *H01T 13/32* (2013.01);

(Continued)

(58) Field of Classification Search
CPC ....... H01T 21/02; H01T 13/02; B23K 26/355; B23K 26/359; B23K 26/40; B23K 2103/50; G06K 19/06046; G06K 1/128
See application file for complete search history.

(56) References Cited

U.S. PATENT DOCUMENTS

| | | | |
|---|---|---|---|
| 6,256,437 B1 | 7/2001 | Sakushima et al. | |
| 9,375,946 B2 | 6/2016 | Zhang | |

(Continued)

FOREIGN PATENT DOCUMENTS

| | | |
|---|---|---|
| DE | 10 2011 121 016 A1 | 6/2012 |
| EP | 3 109 058 A2 | 12/2016 |

(Continued)

OTHER PUBLICATIONS

Extended European Search Report issued in corresponding European Patent Application No. 18171835.4, dated Sep. 20, 2018.

(Continued)

*Primary Examiner* — Tracie Y Green
(74) *Attorney, Agent, or Firm* — Kusner & Jaffe (57) ABSTRACT

An ignition plug such as a spark plug or a glow plug configured to ignite an air-fuel mixture in an internal combustion engine includes a mark that is formed of an oxide film generated on the surface of a metal member or is formed of the metal member and the oxide film. The mark is formed by promoting formation of the oxide film on the surface of the metal member or removing the oxide film through radiation of a laser beam onto the surface of the metal member.

8 Claims, 8 Drawing Sheets

(51) Int. Cl.
*B23K 26/00* (2014.01)
*B23K 26/08* (2014.01)
*H01T 13/04* (2006.01)
*H01T 13/32* (2006.01)
*H01T 13/58* (2011.01)
*B23K 26/364* (2014.01)
*B23K 26/359* (2014.01)
*G06K 1/12* (2006.01)
*B41M 5/24* (2006.01)
*B41M 5/26* (2006.01)
*C21D 10/00* (2006.01)
*G09F 7/16* (2006.01)
*H01T 13/20* (2006.01)
*B23K 101/34* (2006.01)
*B23K 101/36* (2006.01)
*B23K 103/04* (2006.01)
*B23K 103/00* (2006.01)

(52) U.S. Cl.
CPC ............ *H01T 13/58* (2013.01); *B23K 26/352* (2015.10); *B23K 2101/35* (2018.08); *B23K 2101/36* (2018.08); *B23K 2103/04* (2018.08); *B23K 2103/50* (2018.08); *B41M 5/24* (2013.01); *B41M 5/262* (2013.01); *C21D 10/005* (2013.01); *G09F 7/165* (2013.01); *H01T 13/20* (2013.01)

(56) References Cited

U.S. PATENT DOCUMENTS

| | | |
|---|---|---|
| 2007/0216277 A1 | 9/2007 | Yoshida et al. |
| 2011/0107588 A1 | 5/2011 | Mori et al. |
| 2011/0148273 A1 | 6/2011 | Yamada et al. |
| 2012/0144680 A1 | 6/2012 | Scillia et al. |
| 2014/0027412 A1 | 1/2014 | Kato et al. |
| 2014/0204198 A1 | 7/2014 | Fujita |
| 2014/0299016 A1 | 10/2014 | Tabata et al. |
| 2015/0130345 A1 | 5/2015 | Sakakura et al. |

FOREIGN PATENT DOCUMENTS

| | | |
|---|---|---|
| FR | 3 031 116 A1 | 7/2016 |
| JP | H05-269584 A | 10/1993 |
| JP | 3078913 U | 5/2001 |
| JP | 2012-128948 A | 7/2012 |
| JP | 2012-152546 A | 8/2012 |
| JP | 2014-111816 A | 6/2014 |
| WO | WO-2012/132653 A1 | 10/2012 |

OTHER PUBLICATIONS

Office Action received in parent U.S. Appl. No. 15/974,851, dated Oct. 18, 2018.

Office Action issued in corresponding Japanese Patent Application No. 2017-094516 dated Jun. 25, 2019.

METHOD FOR MANUFACTURING AN IGNITION PLUG INCLUDING A MARK FORMED OF AN OXIDE FILM

CROSS-REFERENCE TO RELATED APPLICATIONS

This application is a division of U.S. application Ser. No. 15/974,851, filed May 9, 2018, which is fully incorporated by reference herein.

FIELD OF THE INVENTION

The present invention relates to an ignition plug and a method for manufacturing the ignition plug, and more particularly, to an ignition plug having a mark and a method for manufacturing the ignition plug.

BACKGROUND OF THE INVENTION

There is a technology in which a predefined identifier (mark) is provided on an industrial product and background information on the industrial product becomes traceable throughout procurement, processing, production, distribution, sales, disposal, and the like. Ignition plugs configured to ignite air-fuel mixtures in internal combustion engines are also required to have marks in order to increase the traceability. As a technology for providing a mark on an industrial product, Japanese Registered Utility Model No. 3078913 discloses a technology of printing a mark by radiating a laser beam onto the surface of a ceramic base.

In the related art, however, the mark is formed by radiating the laser beam onto the surface of the ceramic base that is a brittle material. Therefore, the mark may trigger breaking of the base, thereby causing a risk that the strength of the member having the mark may decrease.

SUMMARY OF THE INVENTION

The present invention has been made to address the problem described above. An advantage of the present invention is an ignition plug and a method for manufacturing the ignition plug, which are capable of suppressing a decrease in the strength of a member having a mark.

In order to achieve this advantage, there is provided an ignition plug according to the present invention is configured to ignite an air-fuel mixture in an internal combustion engine. The ignition plug includes a mark that is formed of an oxide film generated on a surface of a metal member or is formed of the metal member and the oxide film.

According to the present invention, there is provided a method for manufacturing an ignition plug configured to ignite an air-fuel mixture in an internal combustion engine. The method includes a preparation step of preparing a metal member that constitutes a part of the ignition plug, and a marking step of forming a mark that is formed of an oxide film or is formed of the metal member and the oxide film by radiating a laser beam onto a surface of the metal member.

According to a first aspect, in the ignition plug, the mark is formed of the oxide film generated on the surface of the metal member or is formed of the metal member and the oxide film. Thus, the decrease in the strength of the member having the mark can be suppressed compared with a case in which the mark is provided on a ceramic member.

According to a second aspect, in the ignition plug, the mark includes a first portion, and a second portion having a reflectance higher than a reflectance of the first portion. A variation of distribution of the reflectance of the first portion or a variation of distribution of the reflectance of the second portion is smaller than a variation of distribution of a reflectance of a portion on the surface of the metal member adjacent to a periphery of the mark or a variation of distribution of a reflectance of an oxide film adjacent to a periphery of the mark.

Therefore, when the mark is read by detecting beams of reflected light, a threshold can be set by using the distribution of the reflectance. Thus, in addition to the advantage of the first aspect, the mark reading accuracy relative to the portion adjacent to the periphery of the mark can be improved.

According to a third aspect, in the ignition plug, the variation of the distribution of the reflectance of the first portion and the variation of the distribution of the reflectance of the second portion are smaller than the variation of the distribution of the reflectance of the portion on the surface of the metal member adjacent to the periphery of the mark or a variation of distribution of a reflectance of an oxide film adjacent to a periphery of the mark.

Thus, in addition to the advantage of the second aspect, the mark reading accuracy can further be improved.

According to a fourth aspect, the ignition plug further includes an insulator, a tubular metal shell that holds the insulator inside, a ground electrode joined to the metal shell, and a tip that is joined to the ground electrode and contains a noble metal. The ground electrode includes a non-plated portion having no plating film formed on a surface thereof. The mark is provided on the non-plated portion of the ground electrode. Thus, in addition to the advantage of any one of the first to third aspects, the mark provided on the ground electrode can be prevented from being lost even when processing for removing the plating film formed on the ground electrode is performed.

According to a fifth aspect, the ignition plug further includes an insulator extending in a direction of an axial line, and a metal terminal fixed to an end of the insulator in the direction of the axial line. The mark is provided on an end face of the metal terminal in the direction of the axial line. The mark can be read in the direction of the axial line of the ignition plug. Thus, in addition to the advantage of any one of the first to fourth aspects, the mark can be read more easily than in a case in which the mark is provided on the side face of the ignition plug.

According to a sixth aspect, in the ignition plug, the metal terminal includes a wall portion that surrounds the end face. Thus, in addition to the advantage of the fifth aspect, the mark can be protected by the wall portion so that the mark is not damaged or rubbed.

According to a seventh aspect, in the method for manufacturing an ignition plug, the metal member that constitutes a part of the ignition plug is prepared in the preparation step. In the marking step, the mark that is formed of the oxide film or is formed of the metal member and the oxide film is formed by radiating the laser beam onto the surface of the metal member. Thus, the decrease in the strength of the metal member having the mark can be suppressed.

According to an eighth aspect, in the method for manufacturing an ignition plug, the mark includes a first portion, and a second portion having a reflectance higher than a reflectance of the first portion. In a first step of the marking step, the laser beam is radiated onto a portion on the surface of the metal member where the first portion is to be formed or a portion on the surface of the metal member where the second portion is to be formed. Thus, in addition to the advantage of the seventh aspect, a mark to be read by detecting beams of reflected light can be formed.

According to a ninth aspect, in the method for manufacturing an ignition plug, in a second step of the marking step, after the first step, the laser beam is radiated onto the portion where the first portion is to be formed but the laser beam is not radiated in the first step or the portion where the second portion is to be formed but the laser beam is not radiated in the first step. As a result, the contrast between the first portion and the second portion can be enhanced. Thus, in addition to the advantage of the eighth aspect, the mark reading accuracy can be improved.

According to a tenth aspect, in the method for manufacturing an ignition plug, in an underlayer forming step of the marking step, before the first step, an underlayer region is formed by radiating the laser beam onto a portion where the mark is to be formed. Since the mark is formed on the underlayer region, the contrast between the mark and the portion adjacent to the periphery of the underlayer region can be enhanced. Thus, in addition to the advantage of the eighth or ninth aspect, the mark reading accuracy can further be improved.

According to an eleventh aspect, in the method for manufacturing an ignition plug, the first portion is formed by promoting formation of the oxide film through radiation of the laser beam. The second portion is formed by removing the oxide film through radiation of the laser beam. Thus, in addition to the advantage of any one of the eighth to tenth aspects, the first portion and the second portion can be formed by controlling a laser output.

DETAILED DESCRIPTION OF THE INVENTION

Figure 1:
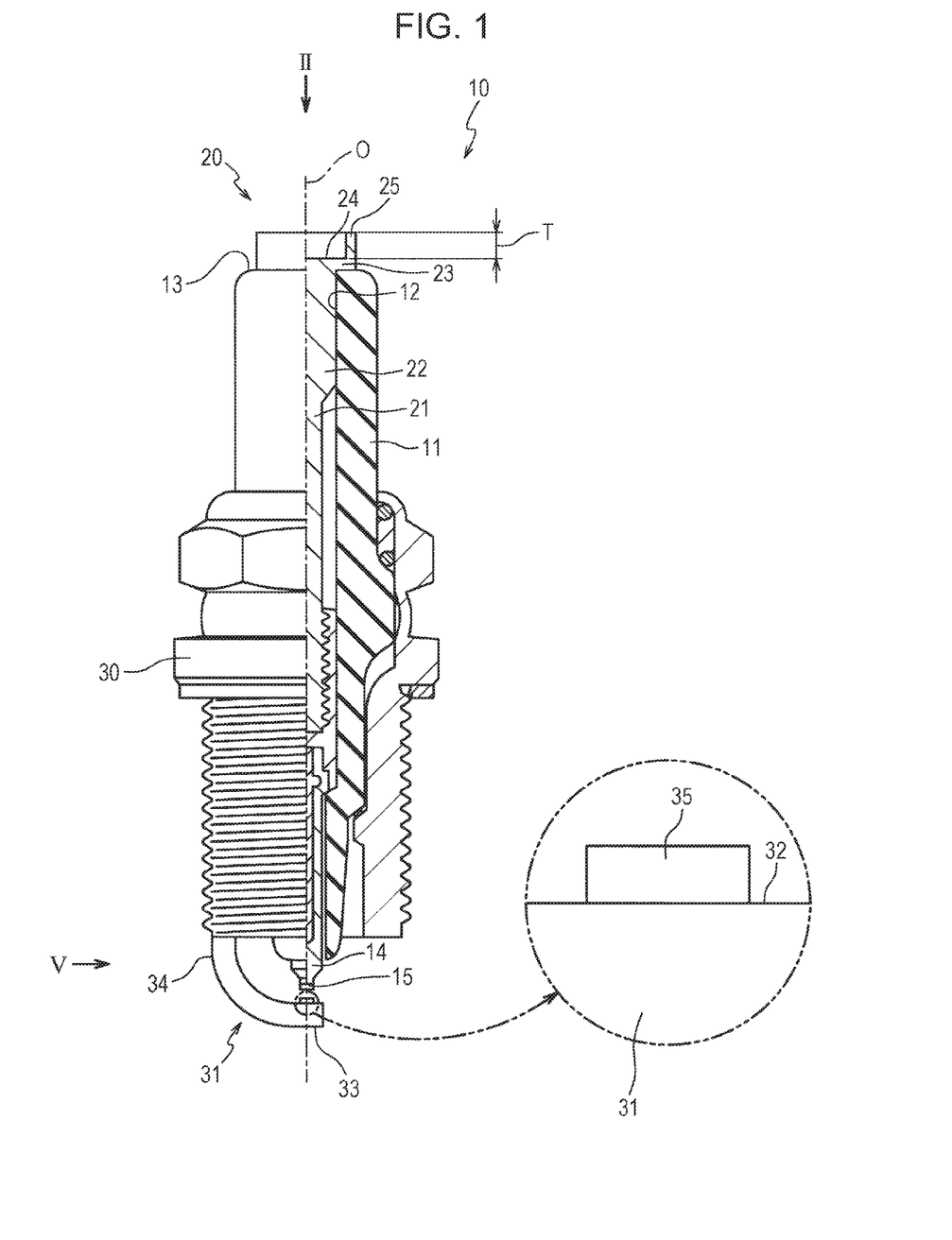
FIG. 1 is a half sectional view of an ignition plug according to one embodiment of the present invention.

A preferred embodiment of the present invention is described below with reference to the accompanying drawings. FIG. 1 is a half sectional view of an ignition plug 10 according to one embodiment of the present invention. In FIG. 1, the lower side of the drawing sheet is referred to as a front end side of the ignition plug 10 and the upper side of the drawing sheet is referred to as a rear end side of the ignition plug 10. The ignition plug 10 is configured to ignite an air-fuel mixture in an internal combustion engine (not illustrated). The ignition plug 10 includes an insulator 11, a metal terminal 20, a metal shell 30, and a ground electrode 31.

The insulator 11 is a cylindrical member formed of, for example, alumina that is excellent in mechanical properties and insulation properties under high temperature. An axial hole 12 is formed through the insulator 11 along an axial line O. A center electrode 14 is arranged on the front end side of the axial hole 12.

The center electrode 14 is a rod-shaped member extending along the axial line O. A core material that is copper or contains copper as a main component is covered with nickel or a nickel-based alloy. The center electrode 14 is held by the insulator 11 and the front end is exposed from the axial hole 12. A tip 15 containing a noble metal is joined to the front end of the center electrode 14.

The metal terminal 20 is a rod-shaped member to which a high-voltage cable (not illustrated) is connected. The metal terminal 20 is formed of a conductive metal material (for example, low-carbon steel). In the metal terminal 20, a shaft portion 21 inserted into the axial hole 12, a fixing portion 22 fitted to the axial hole 12, and a head portion 23 that abuts against a rear end face 13 of the insulator 11 are continuously connected to each other. The head portion 23 is formed into a disc shape and the outer diameter of the head portion 23 is larger than the outer diameter of the shaft portion 21. The head portion 23 is provided with a cylindrical wall portion 25 that surrounds an end face 24 of the metal terminal 20 in a direction of the axial line O.

In this embodiment, the metal terminal 20 is subjected to nickel plating in order to improve the corrosion resistance of the metal terminal 20. A height T of the wall portion 25 from the end face 24 in the direction of the axial line O is set to, for example, 2 mm or less.

The metal shell 30 is a substantially cylindrical member formed of a conductive metal material (for example, low-carbon steel). The metal shell 30 is fixed by crimping to the front end side of the outer periphery of the insulator 11 with a distance from the head portion 23 of the metal terminal 20 in the direction of the axial line O. In this embodiment, a plating film (described later) is formed on the metal shell 30 in order to improve the corrosion resistance of the metal shell 30. The ground electrode 31 is joined to the front end of the metal shell 30.

The ground electrode 31 is a rod-shaped metal (for example, nickel-based alloy) member including a first portion 32 located on the front end side, and a second portion 33 located on a back side of the first portion 32. In this embodiment, a plating film is formed on the ground electrode 31 and is then stripped before a tip 35 (described later) is welded. Thus, a non-plated portion 34 having no plating film is provided on the ground electrode 31 at least on the same surface as that of the second portion 33 and at a root on the rear end side.

The tip 35 containing a noble metal is joined to the first portion 32 of the ground electrode 31. In this embodiment, the ground electrode 31 is bent on the front end side and the first portion 32 faces the center electrode 14 (tip 15). The tip 35 joined to the first portion 32 forms a spark gap between the tip 35 and the center electrode 14 (tip 15).

For example, the ignition plug 10 is manufactured by the following method. First, the center electrode 14 having the tip 15 joined to the front end in advance is inserted into the axial hole 12 of the insulator 11 and is arranged so that the front end of the center electrode 14 is exposed to the outside from the axial hole 12. The shaft portion 21 of the metal terminal 20 is inserted into the axial hole 12 and continuity is secured between the metal terminal 20 and the center electrode 14. Then, the metal shell 30 having the ground electrode 31 joined in advance is attached to the outer periphery of the insulator 11. The tip 35 is joined to the ground electrode 31 and then the ground electrode 31 is bent so that the tip 35 faces the center electrode 14 (tip 15). Thus, the ignition plug 10 is obtained.

Figure 2:
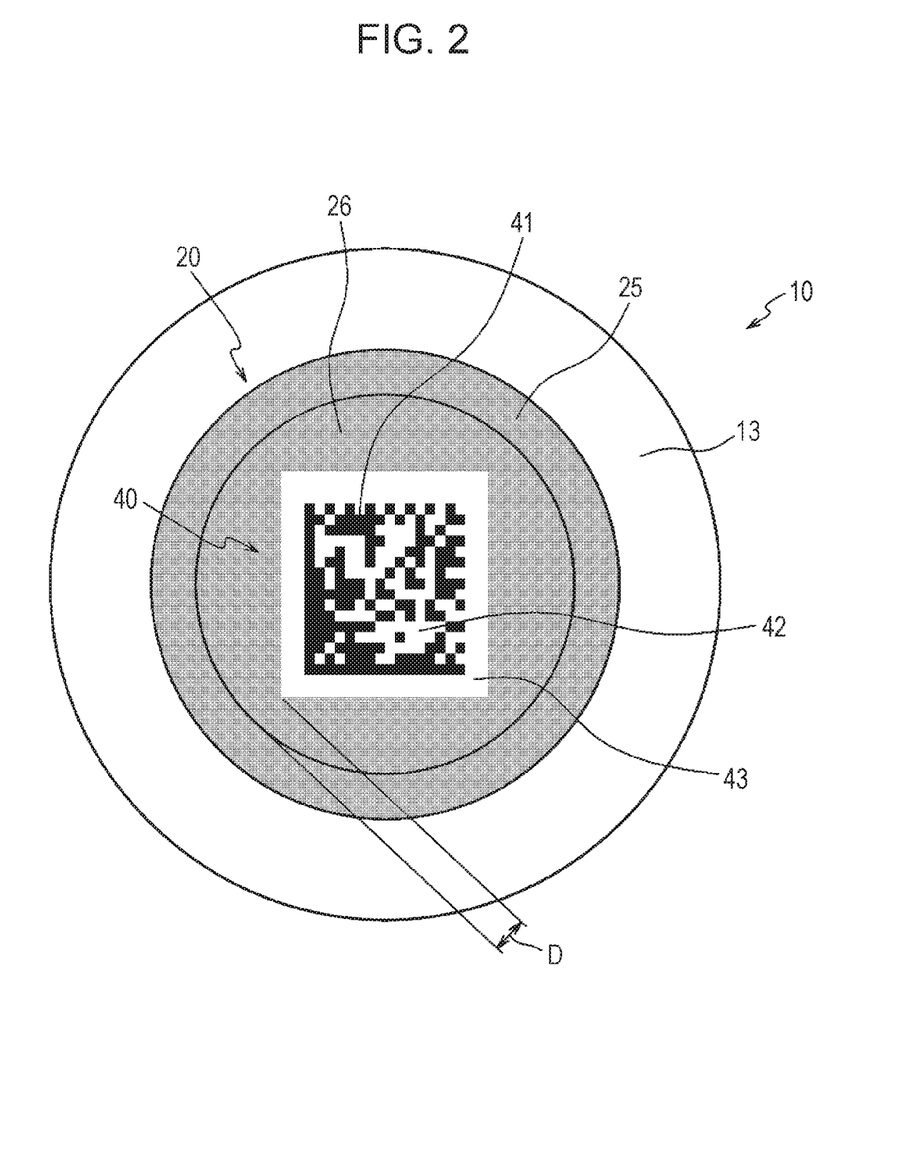
FIG. 2 is a rear view of the ignition plug that is viewed in a direction of the arrow II in FIG. 1.

FIG. 2 is a rear view of the ignition plug 10 that is viewed in a direction of the arrow II in FIG. 1. The metal terminal 20 is oxidized by being affected by a thermal history involving heat treatment performed when the continuity is secured between the metal terminal 20 and the center electrode 14 and baking treatment performed when plating is performed. An oxide film 26 obtained by oxidizing the surface of the head portion 23 is formed on the end face 24 of the metal terminal 20 (see FIG. 1). A mark 40 is formed at the center of the end face 24 of the metal terminal 20 where the oxide film 26 is formed. In this embodiment, the mark 40 is a two-dimensional code. Examples of the two-dimensional code include PDF417, Micro PDF417, CODE49, Maxicode, Data Matrix, QR code, and Aztec. A one-dimensional code may be formed on the metal terminal 20.

The end face 24 of the metal terminal 20 where the mark 40 is formed is surrounded by the wall portion 25. Therefore, the mark 40 can be protected by the wall portion 25. Thus, damage to or rubbing of the mark 40 can be prevented.

The mark 40 includes a first portion 41 that is a group of rectangular cells, and a second portion 42 that is a group of rectangular cells having a reflectance higher than that of the first portion 41. In this embodiment, the first portion 41 is a dark module and the second portion 42 is a light module. A combination of the first portion 41 and the second portion 42 represents background information unique to a product or component. A margin (quiet zone) 43 that corresponds to the edges of the mark 40 and demarcates the mark 40 from a portion adjacent to the periphery of the mark 40 (oxide film 26) is a part of the second portion 42 having a reflectance higher than that of the first portion 41.

The edges of the margin 43 of the mark 40 are formed at positions where the shortest distance from the wall portion 25 is a predetermined shortest distance D. This is because the mark 40 can be read by using reflected light without difficulty that may be caused by blocking of the reflected light or illumination light due to the wall portion 25.

Figure 3A:
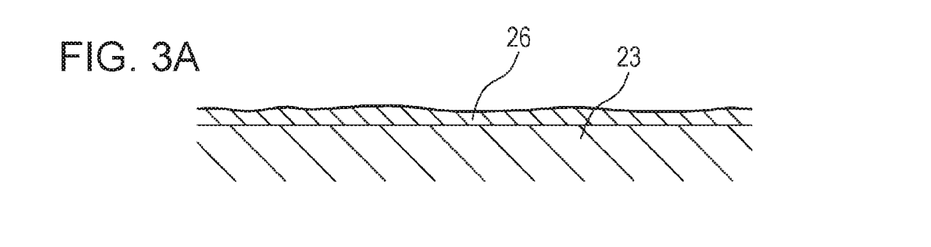
FIG. 3A is a sectional view of a metal terminal taken along an axial line.
Figure 3B:
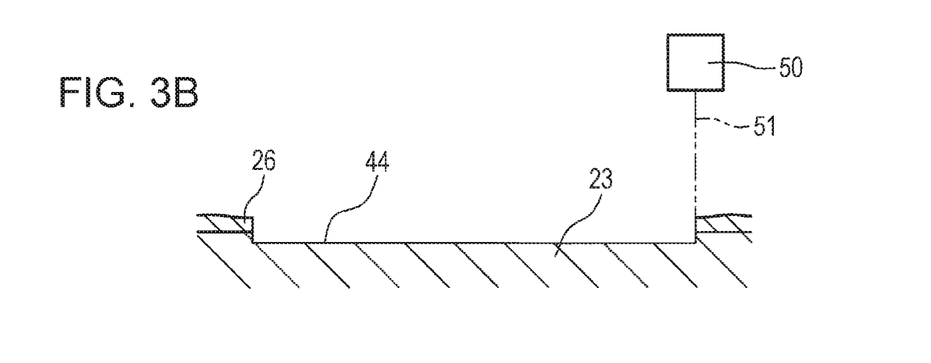
FIG. 3B is a sectional view of the metal terminal taken along the axial line, on which an underlayer region is formed by radiating a laser beam.
Figure 3C:
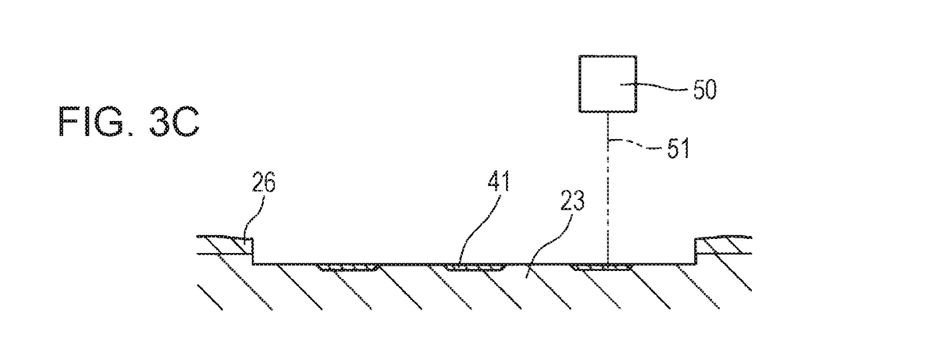
FIG. 3C is a sectional view of the metal terminal taken along the axial line, on which a first portion of a mark is formed by radiating the laser beam.
Figure 3D:
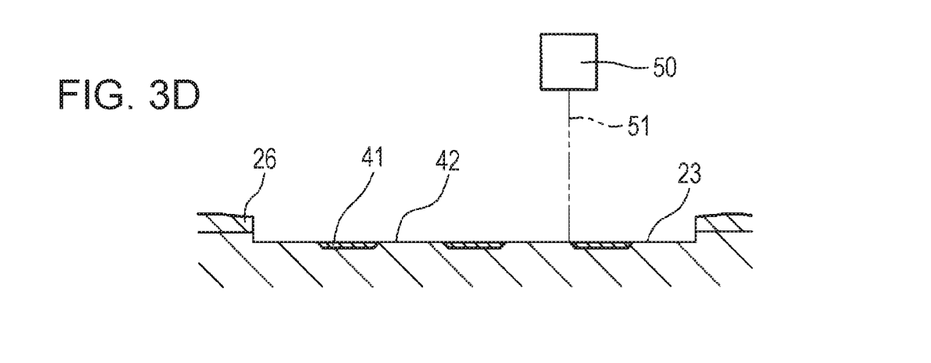
FIG. 3D is a sectional view of the metal terminal taken along the axial line, on which a second portion of the mark is formed by radiating the laser beam.

A marking step of forming the mark 40 on the end face 24 of the metal terminal 20 is described with reference to FIG. 3A to FIG. 3D. FIG. 3A is a sectional view of the metal terminal 20 (head portion 23). FIG. 3B is a sectional view of the metal terminal 20 on which an underlayer region 44 is formed by radiating a laser beam 51. FIG. 3C is a sectional view of the metal terminal 20 on which the first portion 41 of the mark 40 is formed by radiating the laser beam 51. FIG. 3D is a sectional view of the metal terminal 20 on which the second portion 42 of the mark 40 is formed by radiating the laser beam 51.

As illustrated in FIG. 3A, the oxide film 26 obtained by oxidizing the surface of a nickel plating film (not illustrated) is formed on the head portion 23 (metal terminal 20). The oxide film 26 has unevenness in the thickness and density. Therefore, the oxide film 26 is recognized by unaided eyes as being gray or dark gray in a color density depending on the thickness and density.

FIG. 3B illustrates an underlayer forming step of forming the underlayer region 44. In the underlayer forming step, the oxide film 26 is removed by irradiating the head portion 23 with the laser beam 51 emitted from a processing head 50. At a portion where the mark 40 (see FIG. 2) is to be formed, the rectangular underlayer region 44 (background) is formed by relatively moving the processing head 50 along the end face 24 of the head portion 23 (see FIG. 1) and scanning the end face 24 with the laser beam 51.

When the underlayer region 44 is formed, necessary and sufficient energy to remove the oxide film 26 is input to the head portion 23 by adjusting a laser output from the processing head 50, a scanning speed, a focus diameter and a focal depth of the laser beam 51, and the like. This is because new oxidation of the portion irradiated with the laser beam 51 is suppressed to the extent possible while removing the oxide film 26. As a result, the reflectance can be increased while reducing a variation in the color density of the background of the mark 40 (underlayer region 44).

FIG. 3C illustrates a first step of forming the first portion 41. In the first step, the underlayer region 44 is partially heated by irradiating the underlayer region 44 with the laser beam 51 emitted from the processing head 50. This operation promotes formation of an oxide film at the portion heated by radiating the laser beam 51. The first portion 41 is formed by relatively moving the processing head 50 along the end face 24 of the head portion 23 (see FIG. 1) and scanning the end face 24 with the laser beam 51.

When the first portion 41 is formed, energy having a higher level than that for forming the underlayer region 44 is input to the head portion 23 by adjusting the laser output from the processing head 50, the scanning speed, the focus diameter and the focal depth of the laser beam 51, and the like. This operation promotes oxidation of the portion irradiated with the laser beam 51, thereby forming an oxide film on the first portion 41 so that the first portion 41 is turned black.

The degree of oxidation of the first portion 41 can be controlled by the laser output. Therefore, the thickness and density of the oxide film of the first portion 41 can be made substantially uniform. Thus, the contrast of the first portion 41 can be enhanced compared with the oxide film 26 around the mark 40.

The first portion 41 is formed on the underlayer region 44 having a small variation in the color density. Therefore, unevenness of the first portion 41 can be eliminated and the contrast of the first portion 41 can be enhanced compared with a case in which the first portion 41 is formed on the oxide film 26 by radiating the laser beam 51 without forming the underlayer region 44. This is because the first portion 41 formed on the oxide film 26 having a variation in the color density by radiating the laser beam 51 reflects the condition of the oxide film 26 and therefore the variation in the color density also appears in the first portion 41.

FIG. 3D illustrates a second step of forming the second portion 42. In the second step, an oxide film generated at a contour of the second portion 42 by being thermally affected during the formation of the first portion 41 is removed by radiating the laser beam 51 emitted from the processing head 50 onto a portion that is not irradiated with the laser beam 51 in the first step. The second portion 42 is formed by relatively moving the processing head 50 along the end face 24 of the head portion 23 (see FIG. 1) and scanning the end face 24 with the laser beam 51. Thus, the boundary between the first portion 41 and the second portion 42 is clearly defined.

When the second portion 42 is formed, energy having a substantially equal level to that for forming the underlayer region 44 is input to the head portion 23 by adjusting the laser output from the processing head 50, the scanning speed, the focus diameter and the focal depth of the laser beam 51, and the like. By radiating the laser beam 51 also onto the portion other than the boundary between the first portion 41 and the second portion 42, the second portion 42 can be turned white and fouling on the second portion 42 that is generated, for example, during the formation of the first portion 41 can be removed. Thus, the contrast between the first portion 41 and the second portion 42 can be enhanced while improving the dimensional accuracies of the first portion 41 and the second portion 42.

Figure 4A:
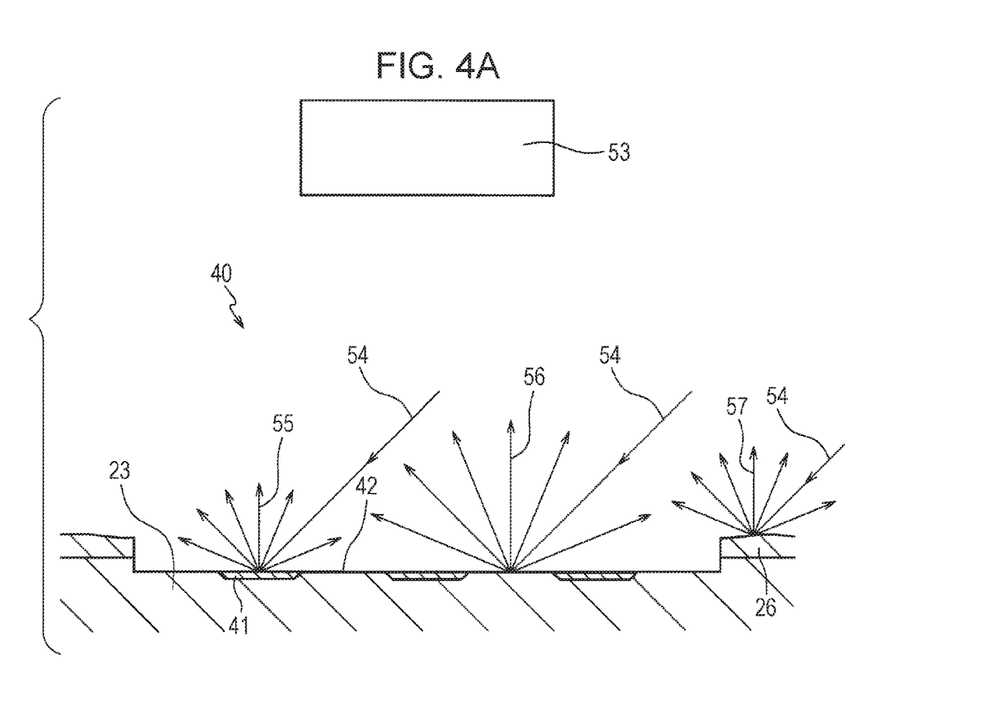
FIG. 4A is a schematic view of beams of reflected light from the mark.

Next, beams of reflected light from the mark 40 are described with reference to FIG. 4A and FIG. 4B. FIG. 4A is a schematic view of the beams of reflected light from the mark 40. The mark 40 is read in such a manner that illumination light 54 is radiated onto the mark 40 and a light receiving element 53 detects beams of reflected light 55, 56, and 57 from the mark 40. The light receiving element 53 is a part of an image capturing element such as a CCD or a CMOS, which is provided with a condenser lens and a color filter. The first portion 41 absorbs more illumination light 54 than the second portion 42 does. Therefore, the light receiving element 53 can receive the reflected light 56 from the second portion 42 more than the reflected light 55 from the first portion 41.

Figure 4B:
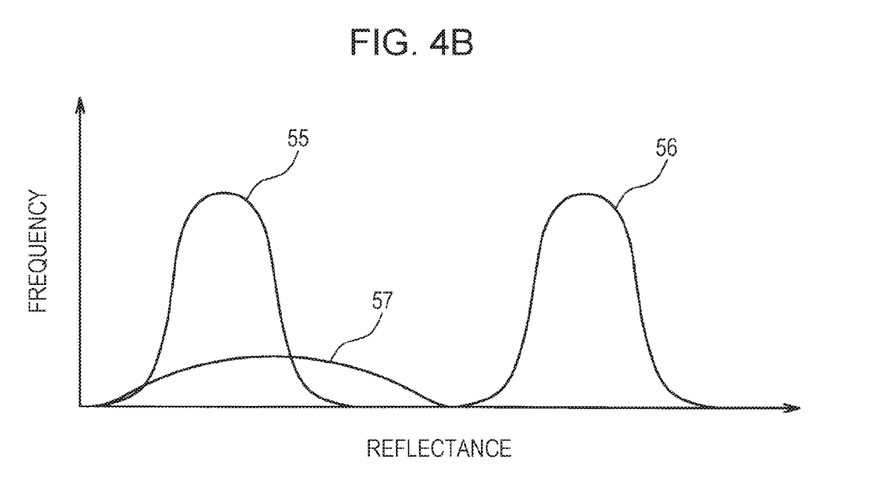
FIG. 4B is a schematic diagram of distribution of reflectance detected by a light receiving element that receives the beams of reflected light from the mark.

FIG. 4B is a schematic diagram of distribution of reflectance detected by the light receiving element 53 that receives the beams of reflected light 55 and 56 from the mark 40. FIG. 4B schematically illustrates distribution of reflectance values indicating the intensities of light received by individual pixels of the light receiving element 53. In FIG. 4B, the horizontal axis represents the reflectance and the vertical axis represents the number of pixels (frequency) of the light receiving element 53 that has detected light.

As illustrated in FIG. 4B, a variation of the distribution of the reflectance of the reflected light 55 from the first portion 41 can be kept smaller than a variation of the distribution of the reflectance of the reflected light 57 from the oxide film 26 (around the mark 40). Further, a variation of the distribution of the reflectance of the reflected light 56 from the second portion 42 can be kept smaller than the variation of the distribution of the reflectance of the reflected light 57 from the oxide film 26 (around the mark 40). This is because the degrees of oxidation of the surfaces of the first portion 41 and the second portion 42 can be controlled by adjusting the laser output and the like.

The reflectance of the reflected light 56 from the second portion 42 is higher than the reflectance of the reflected light 55 from the first portion 41. Therefore, a reflectance value between the distribution of the reflected light 56 and the distribution of the reflected light 55 is set as a threshold. Thus, the first portion 41 (dark module) and the second portion 42 (light module) can be read with higher accuracy than in a case in which the oxide film 26 is used as the dark module. As a result, the reading rate of the light receiving element 53 can be secured and erroneous reading can be prevented.

In the ignition plug 10, the first portion 41 of the mark 40 is formed of the oxide film generated on the surface of the metal terminal 20 and the second portion 42 is formed of the metal terminal 20. Thus, a decrease in the strength of the ignition plug 10 can be suppressed compared with a case in which the mark 40 is provided on a ceramic member such as the insulator 11 that is a brittle material.

A thin oxide film may be formed on the surface of the metal terminal 20 by adjusting the laser output and the like for forming the second portion 42 and the thin oxide film may be used as the second portion 42. This is because the mark 40 that can be used only needs to secure the contrast between the first portion 41 and the second portion 42.

The mark 40 is provided on the end face 24 of the metal terminal 20 and can therefore be read in the direction of the axial line O of the ignition plug 10 even if, for example, the ignition plugs 10 are bundled together. Thus, the mark 40 can be read more easily than in a case in which the mark 40 is provided on the side face of the ignition plug 10, such as the side face of the metal shell 30 or the ground electrode 31.

Figure 5:
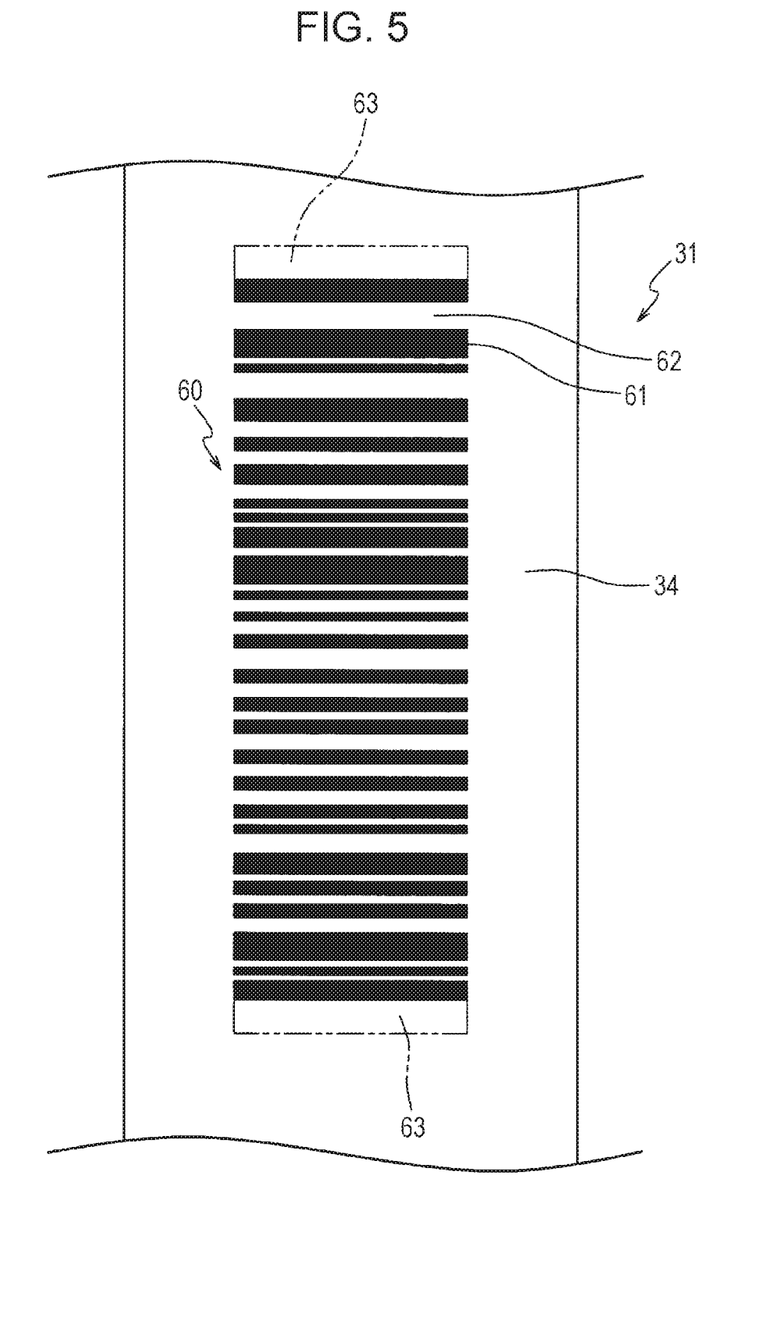
FIG. 5 is a side view of the ignition plug that is viewed in a direction of the arrow V in FIG. 1.

FIG. 5 is a side view of the ignition plug 10 (part of the ground electrode 31) that is viewed in a direction of the arrow V in FIG. 1. In FIG. 5, illustration of both sides of the metal shell 30 and the ground electrode 31 in the direction of the axial line O is omitted. As illustrated in FIG. 5, a mark 60 is formed on the non-plated portion 34 of the ground electrode 31. In this embodiment, the mark 60 is a one-dimensional code (barcode). Examples of the one-dimensional code include CODE39, CODE93, CODE128, ITF, UPA/A, UPA/E, NW-7, GS1-128, JAN8, and JAN13. A two-dimensional code may be formed on the ground electrode 31.

The mark 60 includes a first portion 61 that is a group of rectangular bars, and a second portion 62 that is a group of rectangular bars having a reflectance higher than that of the first portion 61. In this embodiment, the first portion 61 is a dark module and the second portion 62 is a light module. A combination of the first portion 61 and the second portion 62 represents background information unique to a product or component. A margin (quiet zone) 63 that corresponds to both ends of the mark 60 and demarcates the mark 60 from portions adjacent to both ends of the mark 60 is a part of the second portion 62.

Figure 6A:
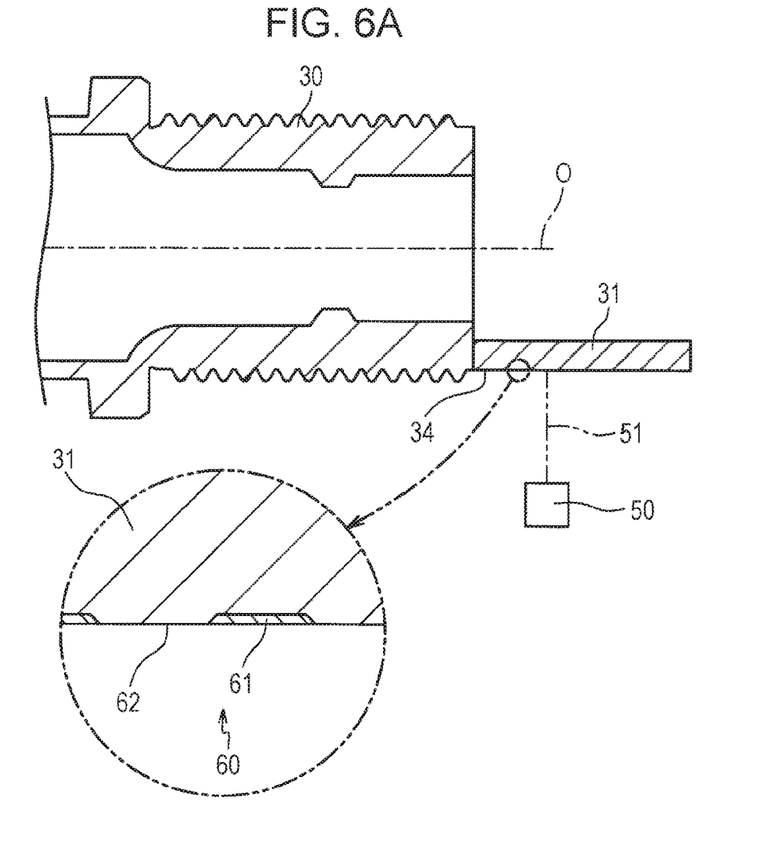
FIG. 6A is a sectional view of a ground electrode on which a mark is formed and a metal shell.
Figure 6B:
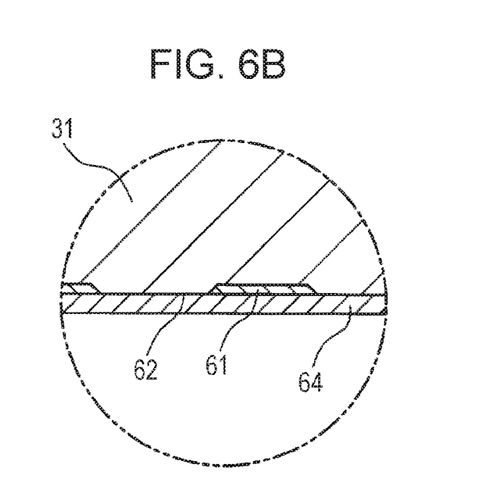
FIG. 6B is a sectional view of the ground electrode on which a plating film is formed.
Figure 7:
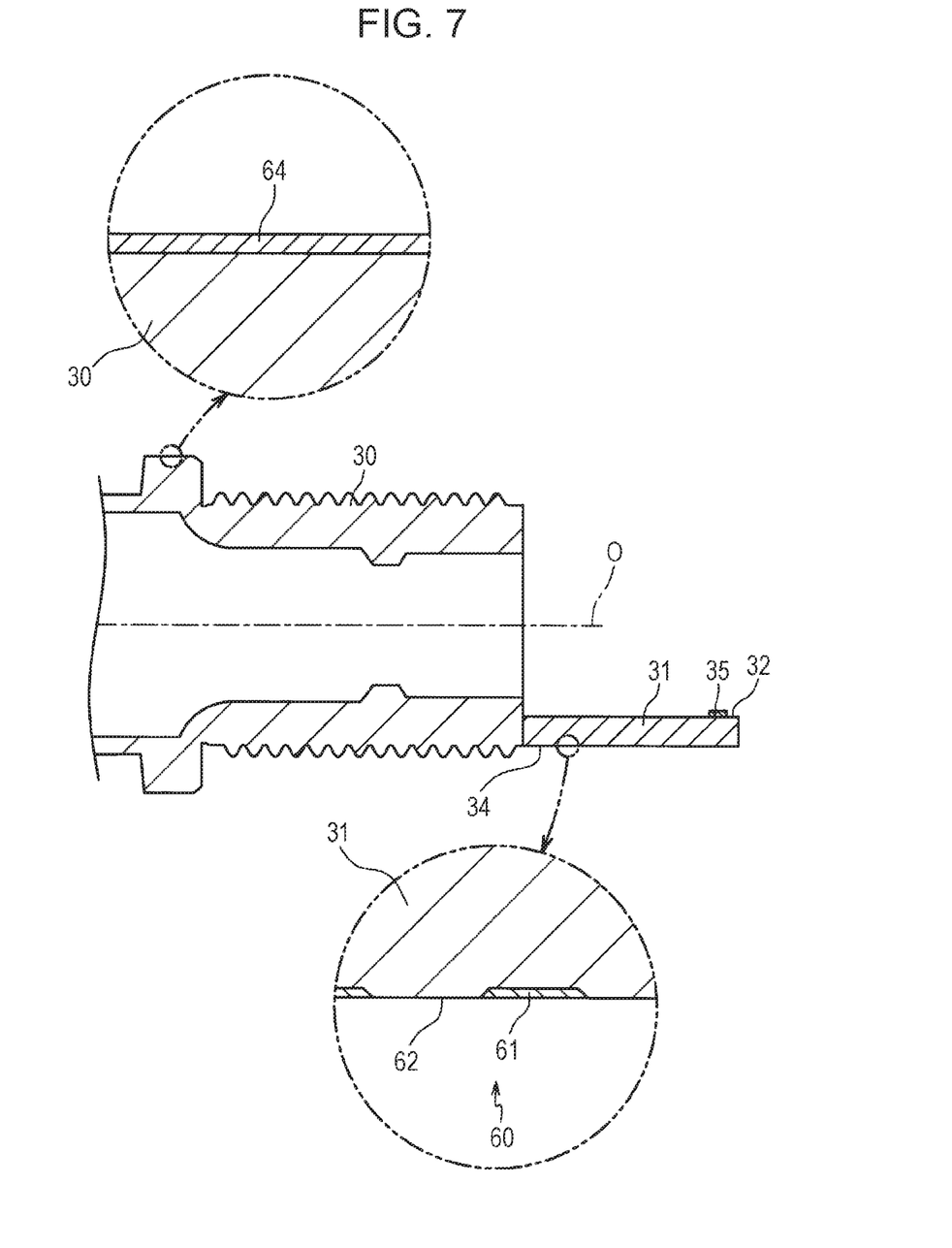
FIG. 7 is a sectional view of the ground electrode to which a tip is welded and the metal shell.

Next, a marking step of forming the mark 60 on the ground electrode 31 is described with reference to FIG. 6A to FIG. 7. FIG. 6A is a sectional view of the ground electrode 31 on which the mark 60 is formed and the metal shell 30. FIG. 6B is a sectional view of the ground electrode 31 on which a plating film 64 is formed. FIG. 7 is a sectional view of the ground electrode 31 to which the tip 35 is welded and the metal shell 30. FIG. 6A and FIG. 7 are sectional views including the axial line O, illustrating the metal shell 30 and the ground electrode 31. FIG. 6A and FIG. 7 illustrate a state before the metal shell 30 is attached to the insulator 11 and before the ground electrode 31 is bent.

As illustrated in FIG. 6A, the mark 60 (see FIG. 5) is formed by radiating the laser beam 51 emitted from the processing head 50 onto the non-plated portion 34 of the ground electrode 31 joined to the metal shell 30. In a first step, the non-plated portion 34 is partially heated by radiating the laser beam 51 onto the non-plated portion 34. This operation promotes formation of an oxide film at the portion irradiated with the laser beam 51. The first portion 61 is formed by relatively moving the processing head 50 along the non-plated portion 34 and scanning the non-plated portion 34 with the laser beam 51. The degree of oxidation of the first portion 61 can be controlled by the laser output. Therefore, the thickness and density of the oxide film of the first portion 61 can be made substantially uniform. Thus, the contrast of the first portion 61 can be enhanced compared with a bare surface of the non-plated portion 34 around the mark 60.

In a second step, an oxide film generated at a contour of the second portion 62 by being thermally affected during the formation of the first portion 61 is removed by radiating the laser beam 51 onto a portion that is not irradiated with the laser beam 51 in the first step. The second portion 62 is formed by relatively moving the processing head 50 along the non-plated portion 34 and scanning the non-plated portion 34 with the laser beam 51.

When the second portion 62 is formed, energy having a lower level than that for forming the first portion 61 is input to the non-plated portion 34 by adjusting the laser output, the scanning speed, the focus diameter and the focal depth of the laser beam 51, and the like. As a result, the second portion 62 can be turned white and the contrast of the first portion 61 to the bare surface of the non-plated portion 34 and the second portion 62 can be enhanced. The mark 60 represents background information on procurement and processing of the metal shell 30 and the ground electrode 31.

As illustrated in FIG. 6B, the plating film 64 is formed on the surfaces of the ground electrode 31 and the metal shell 30 (see FIG. 6A). The plating film 64 is a surface treatment layer for mainly improving the corrosion resistance of the metal shell 30. For example, the plating film 64 mainly contains zinc, zinc subjected to chromate treatment, or nickel. The plating film 64 is formed by performing barrel plating treatment on the metal shell 30 to which the ground electrode 31 is joined. As a result, the plating film 64 is formed not only on the surface of the metal shell 30 but also on the surface of the ground electrode 31. Thus, the first portion 61 and the second portion 62 (mark 60) are also covered with the plating film 64.

As illustrated in FIG. 7, the plating film 64 formed on the ground electrode 31 is removed before the tip 35 is welded. This is because poor welding due to the plating film 64 is prevented. The plating film 64 is partially removed by physical removing means such as ion etching or shot blasting or by chemical removing means for immersing the ground electrode 31 in a stripping solution. When the plating film 64 is removed by the physical or chemical removing means, the mark 60 that has been covered with the plating film 64 appears.

As described above, the mark 60 is formed on the non-plated portion 34 of the ground electrode 31. Therefore, the mark 60 provided on the ground electrode 31 can be prevented from being lost even when the processing for removing the plating film 64 formed on the ground electrode 31 is performed. The mark 60 is formed on the same surface as that of the second portion 33 located on the back side of the first portion 32 to which the tip 35 is joined and at the root on the rear end side of the ground electrode 31. Therefore, the mark 60 can be prevented from being burnt off due to spark discharge caused between the ground electrode 31 and the center electrode 14.

Figure 8A:
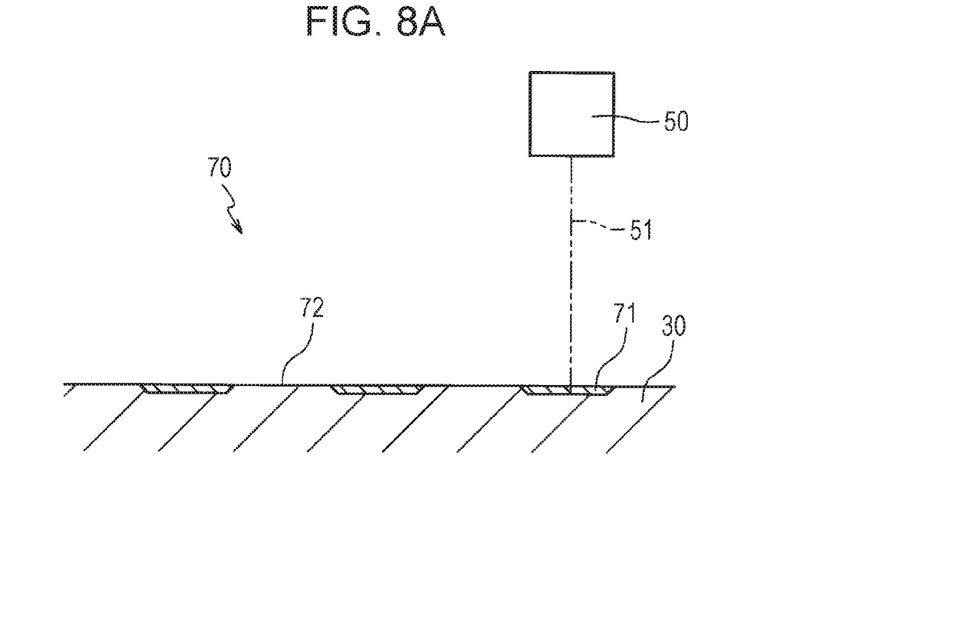
FIG. 8A is a sectional view of the metal shell on which a mark is formed by radiating the laser beam.

Next, a modified example of a mark 70 is described with reference to FIG. 8A and FIG. 8B. In the mark 70 of the modified example, a second portion 72 is formed by using a metallic luster of the metal shell 30. FIG. 8A is a sectional view of the metal shell 30 on which the mark 70 is formed by radiating the laser beam 51.

As illustrated in FIG. 8A, in a marking step, the laser beam 51 is radiated onto the surface of the metal shell 30 and the portion irradiated with the laser beam 51 is oxidized. A first portion 71 is formed of an oxide film on the surface of the metal shell 30 by relatively moving the processing head 50 along the surface of the metal shell 30 and scanning the surface with the laser beam 51. The second portion 72 is a portion that is not irradiated with the laser beam 51 for forming the first portion 71. Thus, the mark 70 (one-dimensional code or two-dimensional code) is formed so as to have the first portion 71 that is recognized by unaided eyes as being black, and the second portion 72 whose metallic luster is recognized by unaided eyes.

Figure 8B:
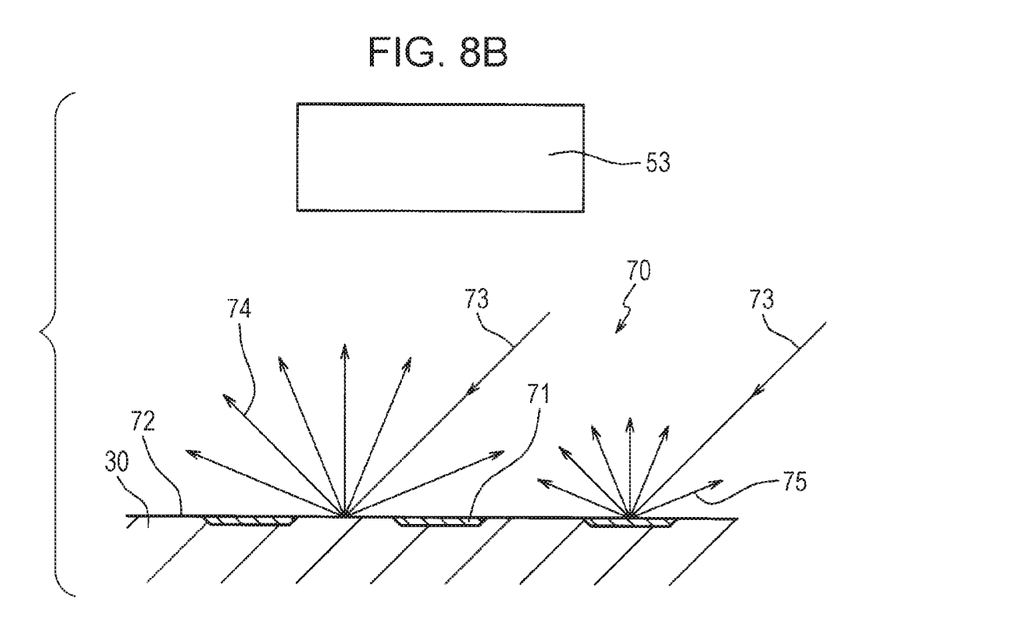
FIG. 8B is a schematic view of beams of reflected light from the mark.

FIG. 8B is a schematic view of beams of reflected light from the mark 70. The mark 70 is read in such a manner that illumination light 73 is radiated onto the mark 70 and the light receiving element 53 detects beams of reflected light 74 and 75 from the mark 70. The first portion 71 and the second portion 72 diffusely reflect the illumination light 73. The first portion 71 formed of the oxide film absorbs more illumination light 73 than the second portion 72 does. Therefore, the intensity of the reflected light 75 from the first portion 71 can be kept lower than the intensity of the reflected light 74 from the second portion 72. As a result, the light receiving element 53 can detect the mark 70 with the first portion 71 serving as a dark module and the second portion 72 serving as a light module.

Considering reflectance detected by the light receiving element 53 that receives the beams of reflected light 74 and 75 from the mark 70, a variation of distribution of the reflectance of the reflected light 75 from the first portion 71 formed by radiating the laser beam 51 can be kept smaller than a variation of distribution of the reflectance of the reflected light 74 from a portion around the mark 70 (the same texture as that of the second portion 72). This is because the degree of oxidation of the first portion 71 can be controlled by the laser output and the like. The reflectance value of the reflected light 74 detected by the light receiving element 53 is higher than the reflectance value of the reflected light 75 detected by the light receiving element 53. Therefore, a reflectance value between the distribution of the reflected light 74 and the distribution of the reflected light 75 is set as a threshold. Thus, the first portion 71 (dark module) and the second portion 72 (light module) can be read with high accuracy.

In the marking step of forming the mark 70, the step of radiating the laser beam 51 onto the metal shell 30 in order to form the second portion 72 can be omitted. Thus, the period of time required for the marking step can be shortened.

The present invention has been described above based on the embodiment but is not limited to the embodiment described above. It can easily be understood that various modifications may be made without departing from the spirit of the present invention.

The embodiment described above is directed to the ignition plug 10 configured to ignite an air-fuel mixture by causing spark discharge between the center electrode 14 and the ground electrode 31 (spark plug). The present invention is not necessarily limited to this case. The mark may be formed on an ignition plug configured to ignite an air-fuel mixture by causing barrier discharge or arc discharge while omitting the ground electrode 31. Further, the mark may be formed on an ignition plug including a heater (glow plug).

The embodiment described above is directed to the case in which the marks are formed on the metal terminal 20, the metal shell 30, and the ground electrode 31 of the ignition plug 10. The present invention is not necessarily limited to this case. The mark may be formed on a metal member (for example, the center electrode 14) other than the metal terminal 20, the metal shell 30, and the ground electrode 31. The center electrode 14 has a portion that cannot be viewed from the outside. The mark that represents background information is provided on the center electrode 14 and the center electrode 14 is pulled out by disassembling the ignition plug 10. In this manner, the mark can be read so as to refer to the background information.

The embodiment described above is directed to the case in which the underlayer region 44 is formed and then the first portion 41 and the second portion 42 are formed during the formation of the mark 40. The present invention is not necessarily limited to this case. For example, the second step of forming the second portion 42 may be omitted. Since the underlayer region 44 is formed, a portion of the underlayer region 44 other than the first portion 41 may be used as the second portion 42 even if the second step is omitted as long as the first portion 41 is formed on the underlayer region 44.

When the lightness of the oxide film 26 is high (the reflectance is high), the underlayer forming step of forming the underlayer region 44 may be omitted and the first portion 41 may be formed on the oxide film 26 by radiating the laser beam 51 onto the oxide film 26 in the first step during the formation of the mark 40. Since the lightness of the oxide film 26 is high, a portion of the oxide film 26 other than the first portion 41 may be used as the second portion 42 as long as the first portion 41 is formed on the oxide film 26. In this case, the first portion 41 and the second portion 42 (entire mark 40) are formed of the oxide film.

After the first portion 41 is formed, the oxide film 26 may be removed to form the second portion 42 by radiating the laser beam 51 onto a portion other than the first portion 41 in the second step. In this case, the first portion 41 of the mark 40 is formed of the oxide film. When the oxide film 26 is left as a thin film at the position of the second portion 42 by reducing the focal depth of the laser beam 51 for forming the second portion 42, the entire mark 40 is formed of the oxide film.

When the lightness of the oxide film 26 is low (the reflectance is low), the underlayer forming step of forming the underlayer region 44 may be omitted and a part of the oxide film 26 may be removed to form the second portion 42 by radiating the laser beam 51 onto the oxide film 26 in the first step during the formation of the mark 40. Since the lightness of the oxide film 26 is low, a portion of the oxide film 26 other than the second portion 42 may be used as the first portion 41 as long as the second portion 42 is formed on the oxide film 26. In this case, the first portion 41 of the mark 40 is formed of the oxide film 26. When the oxide film 26 is left as a thin film at the position of the second portion 42 by reducing the focal depth of the laser beam 51 for forming the second portion 42, the entire mark 40 is formed of the oxide film 26.

After the second portion 42 is formed, oxidation may be promoted to form the first portion 41 by radiating the laser beam 51 onto a portion other than the second portion 42 in the second step. In this case, the first portion 41 of the mark 40 is formed of the oxide film. When the oxide film 26 is left as a thin film at the position of the second portion 42 by reducing the focal depth of the laser beam 51 for forming the second portion 42, the entire mark 40 is formed of the oxide film.

The embodiment described above is directed to the case in which the first portion 61 is formed in the first step and the second portion 62 is formed in the second step during the formation of the mark 60. The present invention is not necessarily limited to this case. When the lightness of the non-plated portion 34 is high (the reflectance is high), the second step may be omitted. Since the lightness of the non-plated portion 34 is high, a portion of the non-plated portion 34 other than the first portion 61 may be used as the second portion 62 as long as the first portion 61 is formed on the non-plated portion 34. The underlayer region 44 may be formed before the first step.

Also when the lightness of the non-plated portion 34 is low (the reflectance is low), the second step may be omitted during the formation of the mark 60. Since the lightness of the non-plated portion 34 is low, a portion of the non-plated portion 34 other than the second portion 62 may be used as the first portion 61 as long as the second portion 62 is formed on the non-plated portion 34.

The embodiment described above is directed to the case in which the mark 60 is formed before the plating film 64 is formed on the metal shell 30 and the ground electrode 31. The present invention is not necessarily limited to this case. The plating film 64 formed on the ground electrode 31 may be removed and then the mark 60 may be formed on the non-plated portion 34 having no plating film 64. In this case, the mark 60 is formed after the tip 35 is welded and therefore background information on the tip 35 and the welding can be recorded.

Although description is omitted in the embodiment described above, a mark having an inverse relationship between the light module and the dark module may be provided on the ignition plug 10 as the mark 40, 60, or 70. In this case, the margins 43 and 63 of the marks 40 and 60 are parts of the first portions 41 and 61 (dark modules).

The embodiment described above is directed to the case in which the mark 40 is provided on the metal terminal 20 having the wall portion 25 that surrounds the end face 24. The present invention is not necessarily limited to this case. A metal terminal 20 without the wall portion 25 may be used. Further, the mark 40 may be provided on the side face of the metal terminal 20 or the like instead of providing the mark 40 on the end face 24 of the metal terminal 20.

Having described the invention, the following is claimed:

1. A method for manufacturing an ignition plug configured to ignite an air-fuel mixture in an internal combustion engine, the method comprising:
    a preparation step of preparing a metal member that constitutes a part of the ignition plug; and
    a marking step of forming a mark that is formed of an oxide film or is formed of the metal member and the oxide film by radiating a laser beam onto a surface of the metal member,
    wherein the mark comprises:
        a first portion; and
        a second portion having a reflectance higher than a reflectance of the first portion, and
    wherein the marking step comprises a first step of radiating the laser beam onto a portion on the surface of the metal member where the first portion is to be formed or a portion on the surface of the metal member where the second portion is to be formed.

2. The method for manufacturing an ignition plug according to claim 1, wherein the marking step further comprises, after the first step, a second step of radiating the laser beam onto the portion where the first portion is to be formed but the laser beam is not radiated in the first step or the portion where the second portion is to be formed but the laser beam is not radiated in the first step.

3. The method for manufacturing an ignition plug according to claim 1, wherein the marking step further comprises, before the first step, an underlayer forming step of forming an underlayer region by radiating the laser beam onto a portion where the mark is to be formed.

4. The method for manufacturing an ignition plug according to claim 2, wherein the marking step further comprises, before the first step, an underlayer forming step of forming an underlayer region by radiating the laser beam onto a portion where the mark is to be formed.

5. The method for manufacturing an ignition plug according to claim 1,
   wherein the first portion is formed by promoting formation of the oxide film through radiation of the laser beam, and
   wherein the second portion is formed by removing the oxide film through radiation of the laser beam.

6. The method for manufacturing an ignition plug according to claim 2,
   wherein the first portion is formed by promoting formation of the oxide film through radiation of the laser beam, and
   wherein the second portion is formed by removing the oxide film through radiation of the laser beam.

7. The method for manufacturing an ignition plug according to claim 3,
   wherein the first portion is formed by promoting formation of the oxide film through radiation of the laser beam, and
   wherein the second portion is formed by removing the oxide film through radiation of the laser beam.

8. The method for manufacturing an ignition plug according to claim 5,
   wherein the first portion is formed by promoting formation of the oxide film through radiation of the laser beam, and
   wherein the second portion is formed by removing the oxide film through radiation of the laser beam.

* * * * *